Patented Aug. 10, 1926.

1,595,498

UNITED STATES PATENT OFFICE.

LOUIS BENDA, OF MAINKUR, NEAR FRANKFORT-ON-THE-MAIN, AND WERNER SCHMIDT, OF FECHENHEIM, NEAR FRANKFORT-ON-THE-MAIN, GERMANY, ASSIGNORS TO I. G. FARBENINDUSTRIE AKTIENGESELLSCHAFT, A CORPORATION OF GERMANY.

PROCESS FOR THE PRODUCTION OF 5-AMINO-3-CHLORO-4-HYDROXYBENZENE-1-ARSONIC ACID.

No Drawing. Application filed December 23, 1925, Serial No. 77,358, and in Switzerland March 2, 1925.

We have found that 5-amino-3-chloro-4-hydroxybenzene-1-arsonic acid may easily be produced in an excellent yield and purity by treating the acyl compounds described in our U. S. application Serial No. 67,654 filed November 7, 1925 with saponifying agents.

The 5-acetyl-amino-3-chloro-4-hydroxybenzene-1-arsonic acid there described is produced by reducing the 5-nitro-3-chloro-4-hydroxybenzene-1-arsonic acid, obtained by nitration from 3-chloro-4-hydroxybenzene-1-arsonic acid, and subsequently treating it with acetic acid anhydride.

This compound which has not been described hitherto, is intended for pharmaceutical purposes and for the production of other pharmaceutical preparations. In contradistinction to the known 3-amino-4-hydroxybenzene-1-arsonic acid free from chlorine, which owing to its poor stability cannot be made use of therapeutically (see Zentralblatt für Haut-und Geschlechtskrankheiten, Vol. XVII, page 689)—it takes on a dark coloration already after a short while even in the purest crystallized state—, the new compound possesses the advantage, in addition to others, of remaining absolutely colorless and undecomposed even if continually exposed to strong light.

*Example.—Chloraminophenolarsonic acid.*

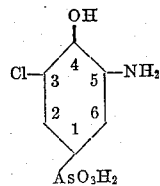

720 g. 3-chloro-4-hydroxy-5-acetylaminobenzenearsonic acid (see U. S. application Serial No. 67654) are for 5 hours digested on the water bath with 1000 g. caustic soda solution 38 Bé. and 1000 g. water. The solution thus obtained is diluted to 3500 cc., cooled down to 30° C. and filtered. On adding hydrochloric acid (on methyl orange the solution should react just feebly acid) the new acid crystallizes gradually as flat, white, small needles. After decanting by suction they are washed neutral with water. The acid crystallizes from hot water in the form of fine, white, small needles. It is rather sparingly soluble in cold water, insoluble in ether, benzene and ligroin, however readily soluble in dilute acids, caustic alkalies and soda solution, and fairly readily so in methyl alcohol. The solution of the diazo compound is intensively yellow and combines with resorcine to a yellowish-red dyestuff.

Having now particularly described and ascertained the nature of our said invention and in what manner the same is to be performed, we declare, that what we claim is:

1. A process for the production of 5-amino-3-chloro-4-hydroxybenzene-1-arsonic acid by saponifying the acylated compounds thereof.

2. As new product the 5-amino-3-chloro-4-hydroxybenzene-1-arsonic acid, the constitution of which corresponds to the formula

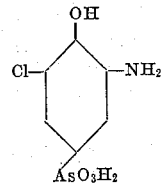

being white needles, rather sparingly soluble in cold water, insoluble in ether, benzene and ligroin, however readily soluble in dilute acids, caustic alkalies and soda solution, and fairly readily so in methyl alcohol.

In witness whereof we have hereunto signed our names this 10th day of December, 1925.

LOUIS BENDA.
WERNER SCHMIDT.